United States Patent
Liu et al.

(10) Patent No.: US 7,649,850 B2
(45) Date of Patent: Jan. 19, 2010

(54) METHOD FOR OBTAINING THE CONVERGENCE RATIO AND APPARATUS THEREOF

(75) Inventors: Guangwei Liu, Shenzhen (CN); Ping Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 12/020,056

(22) Filed: Jan. 25, 2008

(65) Prior Publication Data

US 2008/0117934 A1    May 22, 2008

Related U.S. Application Data

(63) Continuation of application No. PCT/CN2006/001591, filed on Jul. 6, 2006.

(30) Foreign Application Priority Data

Jul. 27, 2005    (CN)    ......................... 2005 1 0087198

(51) Int. Cl.
*H04L 12/26* (2006.01)
(52) U.S. Cl. ...................... 370/252; 370/254; 370/401; 370/437
(58) Field of Classification Search ...................... None
See application file for complete search history.

(56) References Cited

U.S. PATENT DOCUMENTS

| 5,920,571 | A | 7/1999 | Houck et al. | |
|---|---|---|---|---|
| 6,877,035 | B2 * | 4/2005 | Shahabuddin et al. | 709/226 |
| 2005/0190701 | A1 * | 9/2005 | Bejerano et al. | 370/252 |
| 2007/0183446 | A1 * | 8/2007 | Huang | 370/463 |

FOREIGN PATENT DOCUMENTS

| JP | 10126870 A | 5/1998 |
|---|---|---|
| WO | 2007/012251 A1 | 2/2007 |

* cited by examiner

*Primary Examiner*—Hong Cho
*Assistant Examiner*—Robert C Scheibel
(74) *Attorney, Agent, or Firm*—Ladas & Parry LLP

(57) ABSTRACT

A method for obtaining a convergence ratio. Uplink ports of an access/convergence device in the access network are classified into different trunks according to their types. The method includes: determining whether the network is a narrowband access network, and if so, obtaining the service convergence ratio of a trunk according to the number of available slots provided by the trunk for instant services and the number of instant service subscribers supported by the trunk, and if not, determining whether the trunk includes a sub-trunk, and if it does not include a sub-trunk, obtaining the bandwidth convergence ratio of the trunk according to the trunk bandwidth of the trunk and the service bandwidth; if so, obtaining the bandwidth convergence ratio of the trunk according to the trunk bandwidth of the trunk, the service bandwidth and the sub-trunk service bandwidth.

15 Claims, 3 Drawing Sheets

METHOD FOR OBTAINING THE CONVERGENCE RATIO AND APPARATUS THEREOF

CROSS REFERENCES TO RELATED APPLICATIONS

The present application is a continuation of PCT Application No. PCT/CN2006/001591, filed on Jul. 6, 2006, which claims the benefit from Chinese Patent Application CN200510087198.2, filed in the China Patent Office on Jul. 27, 2005, the entire contents of which being incorporated herein by reference.

FIELD OF THE INVENTION

The present invention relates to a network management technique, and especially to a method and apparatus for obtaining a convergence ratio in an access network.

BACKGROUND OF THE INVENTION

The continuous development of communication techniques are significantly influencing people's daily life and social life, especially with the presence of various wideband access techniques. More and more people may thus enjoy the ease of their work, life and entertainment rendered by the wideband techniques. At the same time, however, wideband access techniques are also increasing the complexity of networks, and the difficulty of network maintenance. There is a need for administrators to know the actual operating conditions in the networks at any time.

According to the conventional narrowband accessing scheme, a network application model is as shown in FIG. 1. FIG. 1 is a schematic diagram showing the structure of a conventional narrowband access network according to the prior art. As shown in FIG. 1, a narrowband access equipment is located at a center office (CO) and provides twisted-pair interfaces for connecting voice terminal equipments located at the subscriber side, such as plain old telephone service (POTS). These voice terminal equipments access a public switched telephone network (PSTN) through V5/E1 interfaces provided by the narrowband access equipment located at the CO, thereby achieving a narrowband access function. Because the number of access subscribers is large, a challenge that an operator must deal with is how to reasonably plan and configure these subscribers to achieve a maximal utilization of V5/E1 resources.

In the network planning, each of network nodes is planned in view of its uplink bandwidth and the maximal number of supported subscribers, and information associated with the planning is configured in a network management central for later management. The information includes the exchanging capacity of a node in time division multiplexing (TDM), the maximal number of V5 interfaces supported by the node, the number of 2 M (i.e. E1) links provided by each V5 interface, the maximal number of POTS subscribers supported by the node and etc.

At present, in the narrowband access terminology, a service convergence ratio usually refers to a ratio between the number of slots in 2 M links provided by V5 interfaces of an access equipment, and the maximal number of POTS subscribers supported by the access equipment. By knowledge of the service convergence ratio, it is possible to acquire the utilization of resources provided by the access equipment, and then to reasonably expand the capacity of the access equipment. As shown in FIG. 1, assuming that the narrowband access equipment is able to provide ten E1 interfaces and the narrowband apparatus is planed to support up to 600 POTS subscribers, the service convergence ratio of the narrowband access equipment can be calculated as a ratio between the value obtained by multiplying the number of slots provided by each E1 interface and the number of the E1 interfaces, and the number of the POTS subscribers. For example, each E1 provides thirty-two slots, assuming that there are thirty slots available for instant service. At this time, the service convergence ratio of the narrowband access equipment is (30×10): 600=1:2.

For current methods of obtaining the service convergence ratio, it is impossible to accurately acquire the service convergence ratio of each interface provided by a narrowband access equipment, because the methods determine the service convergence ratio of the access device from the maximal number of configurable V5 interfaces and the maximal number of supportable subscribers of the access equipment.

Even if the V5 interfaces are provided by the same access equipment, the number of configurable 2 M links may not always be equal for each V5 interface. Consequently, the above service convergence ratio determined for the access equipment cannot really reflect the actual service convergence ratio of each V5 interface provided by the access equipment. For example, assuming that the narrowband access equipment as shown in FIG. 1 provides ten E1 interfaces, and each of the E1 interfaces provides thirty slots for instant services; the narrowband access equipment is planned to support up to 600 POTS subscribers, and is configured with two V5 interfaces, where a V5 interface 1 is configured with one 2 M link, and a V5 interface 2 is configured with two 2 M links; 120 POTS subscribers are configured for the V5 interface 1, and 480 POTS subscribers are configured for the V5 interface 2.

The service convergence ratio of V5 interface 1 is (30×1): 120=1:4, meaning that the V5 interface 1 may operate normally only if its actual service convergence ratio is equal to or greater than ¼; the service convergence ratio of the V5 interface 2 is (30×2):480=1:8, meaning that the V5 interface 2 may operate normally only if its instant service convergence ratio is equal to or greater than ⅛. In view of the overall planning for the narrowband access equipment, however, the service convergence ratio of the access equipment is (30×10):600=1 2, meaning that the narrowband access equipment can operate normally only if its instant service convergence ratio is equal to or greater than ½. It is obvious that with the current method of obtaining the service convergence ratio simply by considering the access equipment as a whole, the obtained service convergence ratio cannot reflect the real service convergence ratio of each V5 interface in the access equipment, and may depart from the real one significantly. The service convergence ratio obtained by taking the access equipment as a whole is not reliable for determining the ability of the V5 interfaces in supporting subscribers. Furthermore, the requirement on actual service convergence ratio is stricter than the two configured V5 interfaces. For example, in case the above service convergence ratio of the access equipment is used to determine the configuration of the V5 interface 1, according to the service convergence ratio of V5 interface 1=(30×1):the maximal number of supportable POTS subscribers=1:2, it is derived that the maximal number of accessing POTS subscribers through the V5 interface 1 is 90. It is obvious that the value is much less than the number 120 of POTS subscribers that the V5 interface 1 can actually support, thus causing waste of resources of the two V5 interfaces.

In addition, in the method of obtaining the service convergence ratio according to the prior art, there is no bandwidth convergence ratio provided for a broadband access network. With regard to the narrowband access network, the obtained convergence ratio may limit the ability of subscribers supported by the access equipment in simultaneous calls. As compared to the narrowband access network, there is no limit on simultaneous service provisioning for the broadband access network. However, because of the bandwidth limitation for uplink ports, it is impossible to accommodate infinite accessing subscribers. Therefore, for the broadband access network, it is necessary to know how many subscribers can be appropriately supported under uplink bandwidth condition provided by the network.

At present, although operators have carefully planned the network before construction, in the actual operating environment, they are not able to judge accurately, for example, whether it is necessary to add V5 interfaces, or add 2 M links to the configured V5 interfaces when expanding capacity to accommodate more subscribers, nor to accurately know operating conditions of the V5 interfaces.

SUMMARY OF THE INVENTION

In view of these, a main object of the present invention is to provide a method of obtaining a convergence ratio that accurately reflects the actual service or bandwidth convergence ratio in an access network, so as to provide a direct and accurate determining ground for a user to perform network planning.

Another object of the present invention is to provide an apparatus for obtaining a convergence ratio that accurately reflects the actual service or bandwidth convergence ratio in an access network, so as to provide a direct and accurate determining ground for a user to perform network planning.

In order to achieve the above objects, the technical solution of the present invention is as follows:

Uplink ports of an access/convergence device in the access network are classified into different trunks according to their types, and the method also includes the following step:

A. determining whether the access network is a narrowband access network, and if it is a narrowband access network, obtaining the service convergence ratio of a trunk according to the number of available slots provided by the trunk for instant services and the number of instant service subscribers supported by the trunk; and if it is a wideband access network, then proceeding to step B;

B. determining whether the trunk includes a sub-trunk, and if it does not include a sub-trunk, obtaining the bandwidth convergence ratio of the trunk according to the trunk bandwidth of the trunk and the service bandwidth; if it includes a sub-trunk, obtaining the bandwidth convergence ratio of the trunk according to the sub-trunk service bandwidth, the service bandwidth and the trunk bandwidth of the trunk.

The method also includes: classifying those, which access the network through uplink ports of the access/convergence device, of uplink ports of a lower-level access/convergence device under the access/convergence device into a sub-trunk of the trunk of the access/convergence device.

In step A, the method for obtaining the service convergence ratio of the trunk includes calculating a ratio between the number of available instant service slots provided by the trunk and the number of instant service subscribers supported by the trunk.

In step B, when the sub-trunk is not included, the method for obtaining the bandwidth convergence ratio of the trunk includes calculating a ratio between the trunk bandwidth and the service bandwidth of the trunk.

In step B, when the sub-trunk is included, the method for obtaining the bandwidth convergence ratio of the trunk includes calculating a sum of the total bandwidth of subscribers supported by the trunk and the service bandwidth of the sub-trunk, and calculating a ratio between the trunk bandwidth of the trunk and the calculated sum.

The service bandwidth of the sub-trunk is the smaller value of the total bandwidth of subscribers supported by the sub-trunk and the trunk bandwidth of the sub-trunk.

The service or bandwidth convergence ratio of the trunk includes the uplink service or bandwidth convergence ratio of the trunk and the downlink service or bandwidth convergence ratio of the trunk; corresponding to the uplink service or bandwidth convergence ratio, the service bandwidth of a trunk/the service bandwidth of a sub-trunk is the uplink service bandwidth of the trunk/the uplink service bandwidth of the sub-trunk; corresponding to the downlink service or bandwidth convergence ratio, the service bandwidth of a trunk/the service bandwidth of a sub-trunk is the downlink service bandwidth of the trunk/the downlink service bandwidth of the sub-trunk.

The sub-trunk further includes a lower-level sub-trunk, and the service bandwidth of the sub-trunk is obtained via a recursive method.

The method also includes displaying, according to information on the configured network, a list of subscribers supported by the trunk, a list of subscribers whose accessing is influenced when the trunk is failed, a real time bandwidth utilization of the trunk, and a graph showing the service or bandwidth convergence ratio.

An apparatus for obtaining a convergence ratio includes a first determining module, a second determining module, a first calculating module, a second calculating module and a third calculating module, wherein the first determining module is adapted for determining whether the present access network is a narrowband access network, and notifying the first calculating module or the second determining module of the determination;

the second determining module is adapted for receiving the notification from the first determining module, determining whether the trunk includes a sub-trunk, and sending a notification of the determination to the second calculating module and the third calculating module;

the first calculating module is adapted for receiving the notification from the first determining module, and calculating a service convergence ratio of the trunk;

the second calculating module is adapted for receiving the notification from the second determining module, and calculating a first bandwidth convergence ratio of the trunk;

the third calculating module is adapted for receiving the notification from the second determining module, and calculating a second bandwidth convergence ratio of the trunk.

It can be seen from the above technical solution that, the present invention classifies different types of uplink ports of different access/convergence devices in an access network into different trunks. The different trunks are configured with different service or bandwidth convergence ratios according to an actual access condition in the network. For a narrowband access network, the service convergence ratio of a trunk is obtained according to the number of available slots for instant services provided by the trunk and the number of instant service subscribers supported by the trunk in the information on the configured networking; for a wideband access network, if the trunk does not include a sub-trunk, the bandwidth convergence ratio is obtained according to the trunk bandwidth of the trunk and the service bandwidth in the information on the configured network; if the trunk includes a sub-trunk, the bandwidth convergence ratio is obtained according to the sub-trunk service bandwidth, the service bandwidth and the trunk bandwidth of the trunk in the information on the configured network. The service or bandwidth convergence ratio obtained through the present invention accurately reflects the condition of an actual service or bandwidth convergence ratio in the access network; the present invention also provides information such as the actual bandwidth utilization of trunks, the graph showing the service or bandwidth convergence ratio, and the influenced interfaces due to a failed trunk, provides a direct and accurate determining ground for a user to perform network planning, ensures the sufficient utilization of resources, and at the same time, avoids making decisions such as a blind capacity expansion.

DETAILED DESCRIPTION OF THE EMBODIMENTS

It follows from the embodiments of the present invention that, in an access network, uplink ports of an access/convergence device in the access network are classified into different trunks according to their types, and different trunks are configured with different service or bandwidth convergence ratios according to an actual access condition in the network, thus accurately reflecting the actual service or bandwidth convergence ratio in the access network, so as to provide a direct and accurate determining ground for a user to perform network planning.

To make the objects, technical solutions and advantages of the present invention more apparent, the present invention will now be further described in detail below with reference to the accompanying drawings and preferred embodiments.

In order to accurately reflect the actual service or bandwidth convergence ratios in the access network, the present invention classifies uplink ports of an access/convergence device in the access network into different trunks according to their types. In this document, a trunk is a set of uplink ports of different types in the access/convergence device. If an access/convergence device connects to a lower-level access/convergence device, a set of those, which access the network through uplink ports of the lower-level access/convergence device, of uplink ports of the lower-level access/convergence device is called as a sub-trunk of the trunk of the access/convergence device. Also, information relating to the classified trunks/sub-trunks, such as trunk/sub-trunk bandwidth, maximal number of subscribers carried by the trunks/sub-trunks, uplink and downlink bandwidths, is configured in a network management center.

Figure 1:
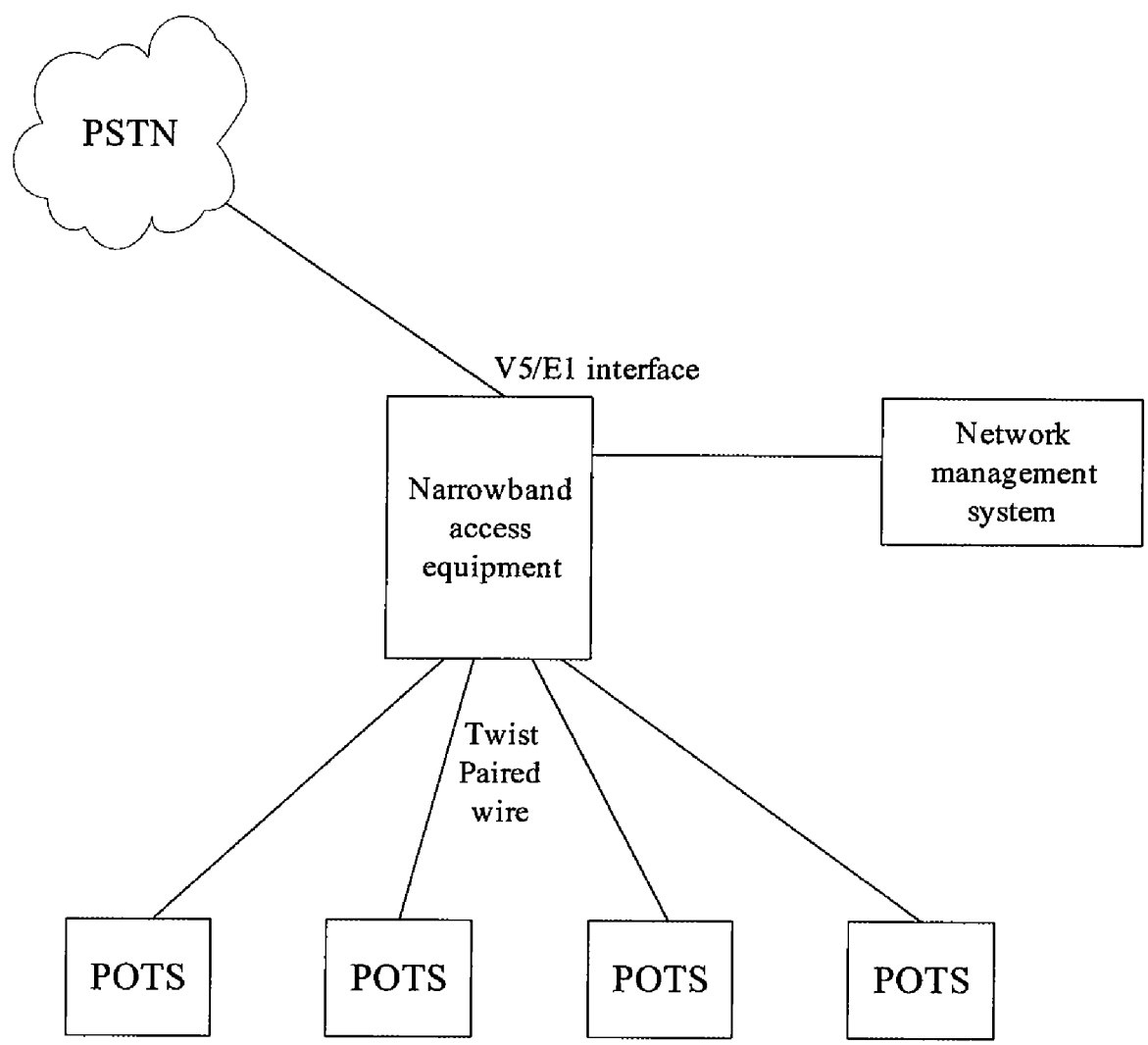
FIG. 1 is a schematic diagram illustrating the structure of a conventional narrowband access network.
Figure 2:
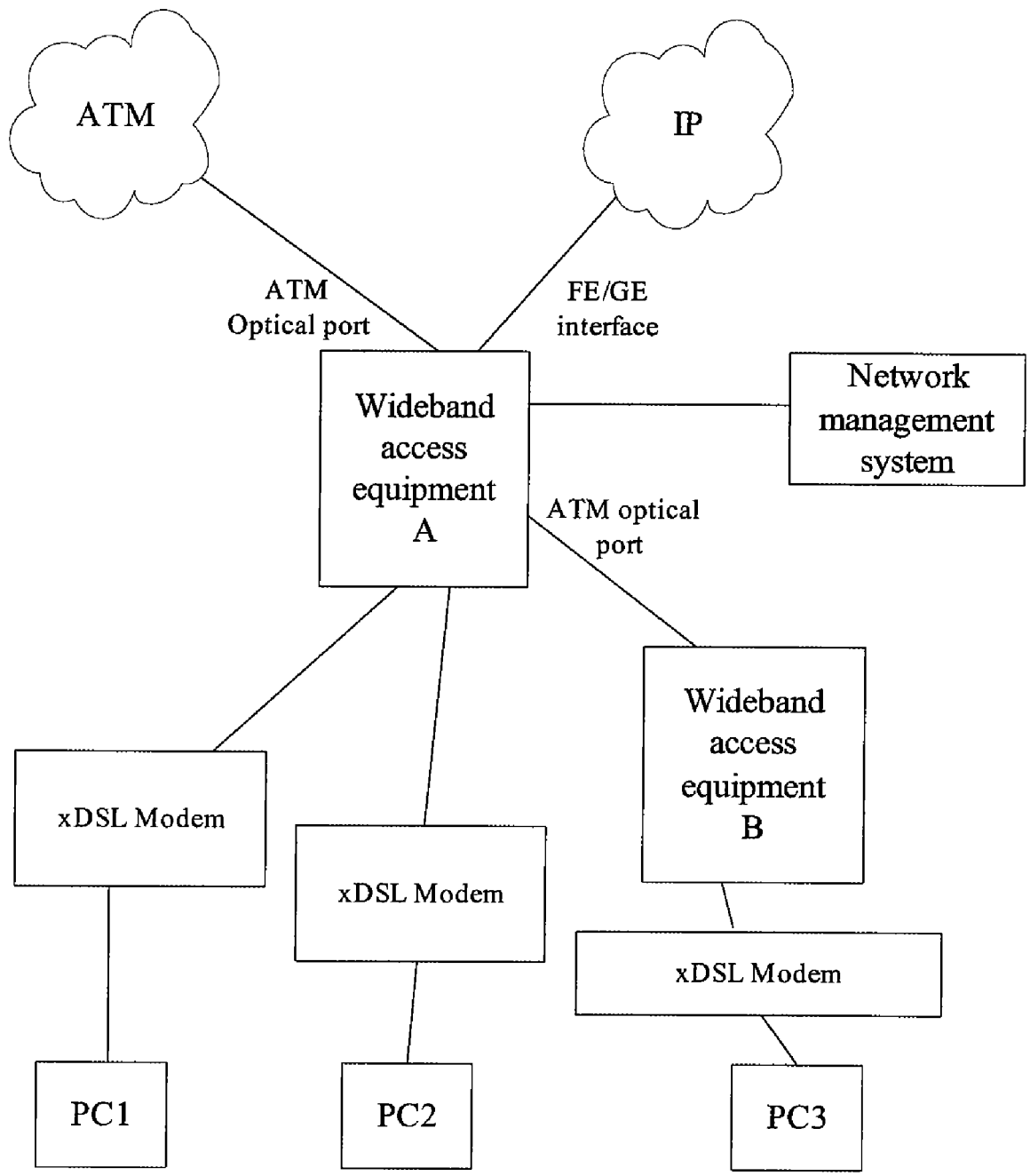
FIG. 2 is a schematic diagram illustrating the structure of a network according to a wideband access network embodiment of the present invention.

FIG. 2 is a schematic diagram of the structure of a wideband access network according to an embodiment of the present invention. As shown in FIG. 2, a wideband access equipment A connects to a lower-level wideband access equipment B. The wideband access equipment A accesses to an ATM backbone and an IP backbone respectively through an uplink ATM optical port and an uplink FE/GE interface; the wideband access equipment B connects to the wideband access equipment A through an uplink ATM optical port. A computer PC1 is connected to the wideband access equipment A through a digital subscriber line modem (xDSL Modem), and then accesses to IP backbone through the uplink FE/GE interface of the wideband access equipment A; a computer PC2 is connected to the wideband access equipment A through an xDSL Modem, and then accesses to the ATM backbone through the uplink ATM optical port of the wideband access equipment A; a computer PC3 is connected to the wideband access equipment B through the xDSL Modem. The wideband access equipment B is connected to the wideband access equipment A through the uplink ATM optical port, and then accesses to the ATM backbone through the uplink ATM optical port of the wideband access equipment A.

It can be seen from FIG. 2 that, the trunks in the wideband access network may be classified into three trunk objects: a trunk A1 representing a set of uplink ATM optical ports of the wideband access equipment A, a trunk A2 representing a set of uplink FE/GE interfaces of the wideband access equipment A, and a trunk B representing a set of uplink ATM optical ports of the wideband access equipment B. With respect to the trunk A1, the trunk B is a sub-trunk of the trunk A1. In obtaining a bandwidth convergence ratio of the trunk A, it is necessary to take account of not only the subscriber PC2 accessing to the trunk A, but also the subscriber PC3 accessing to the trunk B, because subscribers of the trunk B finally accesses to the ATM backbone via the trunk A1.

Figure 3:
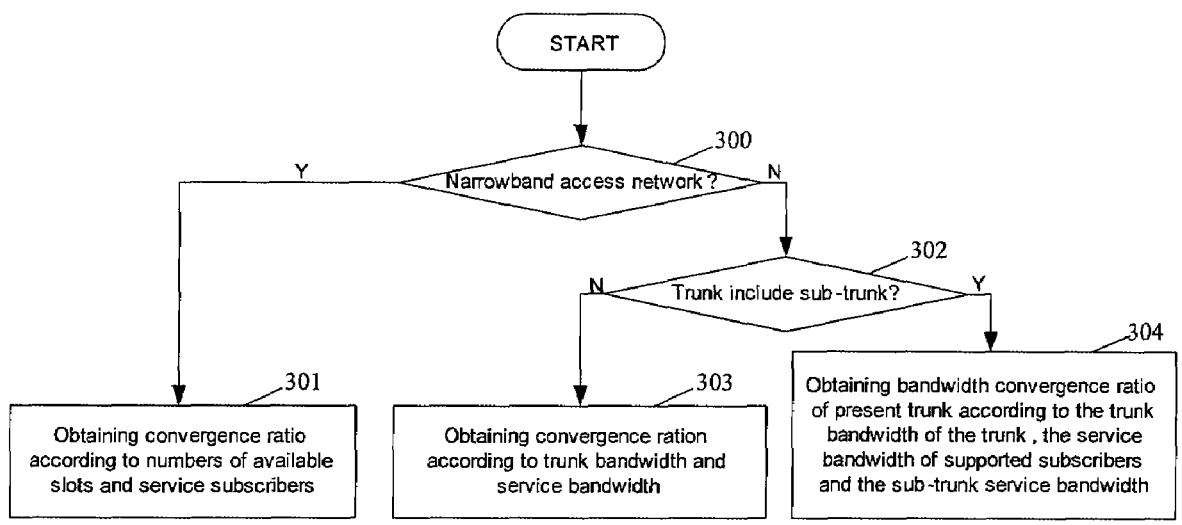
FIG. 3 is a flow chart of a method of obtaining a convergence ratio according to the present invention.

All the information relating to the above access network is configured in a network management center, and in addition, the network management center may be configured with information such as topology structure of the present access network, whether the present network is a narrowband access network or a wideband access network, maximal bandwidths provided by respective trunks in the present access network, maximal numbers of subscribers supported by the trunks. After the trunk of the above wideband access network is classified, the bandwidth convergence ratios of different trunks may be obtained according to the flow chart as shown in FIG. 3.

It is assumed that all the xDSL Modems in FIG. 2 have a rate of 2 M in both uplink and downlink directions, meaning that the uplink and downlink service bandwidths allocated to each subscriber are 2 M; the bandwidth of the ATM optical port is 155 M, meaning that the trunk bandwidths of the trunk A1 and the trunk B are 155 M; the bandwidth of the FE interface is 100 M, meaning that the trunk bandwidth of the trunk A2 is 100 M. FIG. 3 is the flow chart of a method according to the present invention for obtaining a bandwidth convergence ratio. The method specifically includes the following processes:

Processes 300 to 301: determining whether the present access network is a narrowband access network, and if it is a narrowband access network, obtaining the service convergence ratio of a trunk according to a ration between the number of available slots provided by the trunk for instant services and the number of instant service subscribers supported by the trunk; and if it is not a narrowband access network, proceeding to process 302.

Whether the present access network is a narrowband access network or a wideband access network may be determined according to the actual network configuration in the network management center, if an identification representing the narrowband access network presents in the configuration, the present access network is a narrowband access network; if an identification representing the wideband access network presents in the configuration, the present access network is a wideband access network.

In this process, the number of available slots provided for instant services by a trunk and the number of instant service subscribers supported by the trunk are previously configured in the network management center of a network management system according to the hardware condition of the present network.

It can be seen from the above method for obtaining the service convergence ratio of a narrowband access network that, the method for obtaining the service convergence ratio for a narrowband access network according to the present invention adopts instant values, i.e., parameters for the network in actual operation. Therefore, the method of the present invention accurately reflects the actual service or bandwidth convergence ratios in the access network as compared to the method for obtaining a service convergence ratio according to the prior art.

Process 302: determining whether the present trunk includes a sub-trunk, and if it does not include a sub-trunk, proceeding to process 303; if it includes a sub-trunk, proceeding to process 304.

Whether the present trunk includes a sub-trunk is determined according to the configuration in the network management center. If the configuration indicates the inclusion, it is determined that the present trunk includes a sub-trunk; if the configuration does not indicate the inclusion, it is determined that the present trunk do not include a sub-trunk.

By referring to FIG. 2, in this embodiment, it follows that the trunk A1 includes a sub-trunk, the sub-trunk of the trunk A1 is the trunk B; the trunk B do not include a sub-trunk; the trunk A2 do not include a sub-trunk, according to the configuration information.

Process 303: obtaining the bandwidth convergence ratio of the present trunk according to the trunk bandwidth of the present trunk and the service bandwidth.

A method for obtaining the bandwidth convergence ratio of the present trunk may be as follows: calculating a ratio between the trunk bandwidth of the present trunk and the service bandwidth, as the bandwidth convergence ratio of the present trunk. When the trunk bandwidth of the present trunk and the service bandwidth may be previously configured according to the hardware condition of the present network. The bandwidth convergence ratio of a trunk including no sub-trunk may be represented by the following formula (1):

$$\text{the bandwidth convergence ratio of the present trunk} = \text{the trunk bandwidth of the present trunk}:\text{the service bandwidth of the present trunk} \quad (1)$$

and the service bandwidth of the present trunk is a sum of service bandwidths of all the subscribers supported by the present trunk.

In this embodiment, the trunk A2 only supports the subscriber PC1, so the service bandwidth of the trunk A2 is 2 M; the trunk B only supports the subscriber PC3, so the sum of bandwidths of subscribers supported by the trunk B is 2 M.

The bandwidth convergence ratio of the trunk A2 is 100:2=1:0.02.

The bandwidth convergence ratio of the trunk B is 155:2=1:0.013.

Process 304: obtaining the bandwidth convergence ratio of the present trunk according to the sub-trunk service bandwidth, the service bandwidth and the trunk bandwidth of the present trunk.

A method for obtaining the bandwidth convergence ratio of the present trunk may be as follows: calculating a sum of a total sum of the bandwidths of subscribers supported by the present trunk and the service bandwidth of the sub-trunk, and then calculating a ratio between the trunk bandwidth of the present trunk and the calculated sum as the bandwidth convergence ratio of the present trunk. A method for obtaining the service bandwidth of a sub-trunk may be as follows: selecting the smaller value of the trunk bandwidth of sub-trunk and the total sum of the bandwidths of subscribers supported by the sub-trunk, and if the trunk bandwidth of sub-trunk is equal to the total sum of the bandwidths of subscribers supported by the sub-trunk, then selecting any one of them. At this point, the trunk bandwidth of the present trunk and the total sum of the bandwidths of subscribers supported by the present trunk, as well as the trunk bandwidth of the sub-trunk and the total sum of the bandwidths of subscribers supported by the sub-trunk may be previously configured in the network management center of a network management system according to the hardware condition of the present network. The bandwidth convergence ratio of the trunk having a sub-trunk may be represented by the following formula (2):

$$\text{the bandwidth convergence ratio of the present trunk} = \text{the trunk bandwidth of the present trunk}:(\text{a total sum of the bandwidths of subscribers supported by the present trunk} + \text{the service bandwidth of the sub-trunk}) \quad (2)$$

$$\text{where the service bandwidth of the sub-trunk} = \min(\text{the trunk bandwidth of the sub-trunk, the total sum of the bandwidths of subscribers supported by the sub-trunk}) \quad (3)$$

The total sum of the bandwidths of subscribers supported by the trunk is a sum of service bandwidths of all the supported subscribers.

The total sum of the bandwidths of subscribers supported by the sub-trunk is a sum of service bandwidths of all the supported subscribers.

In this embodiment, the trunk A1 only supports the subscriber PC2, so the total sum of the bandwidths of subscribers supported by the trunk A1 is 2 M; the trunk B only supports the subscriber PC3, so the total sum of the bandwidths of subscribers supported by the trunk B is 2 M.

The bandwidth convergence ratio of the trunk A1=155:(2+min(155, 2))=155:4=1:0.0258.

It should be noted that, in this embodiment, because the uplink and downlink bandwidths are equal and the uplink and downlink bandwidth convergence ratios are equal, the uplink and downlink bandwidth convergence ratios of the trunk are not calculated separately. In fact, the above formulas according to the present invention for calculating the bandwidth convergence ratio are applicable for the calculation of the bandwidth convergence ratio of an uplink trunk and the bandwidth convergence ratio of a downlink trunk, except for the value of the service bandwidth in the formulas. In addition, in a narrowband access network, the formulas according to the present invention for calculating the service convergence ratio are applicable for the service convergence ratio of an uplink trunk and the service convergence ratio of a downlink trunk.

If a sub-trunk trunk further includes a lower-level sub-trunk, the service bandwidth of the sub-trunk is calculated via a recursive method, until there is no further sub-trunk unprocessed. For example, a trunk A includes a sub-trunk B, and the sub-trunk B also includes a lower-level sub-trunk C. The service bandwidth of the sub-trunk C is first calculated according to the above formula (3), and then the service bandwidth of the sub-trunk B is calculated by treating the sub-trunk C as a subscriber supported by the sub-trunk B and taking the calculated result as the bandwidth of the subscriber supported by the sub-trunk B. Finally the convergence ratio of the trunk A is calculated by substituting the service bandwidth of the sub-trunk B into the above formula (2).

In addition, the present invention performs the display of relevant information in classifications according to the configuration of the present access network, for example, a list of subscribers PC2, PC3 supported by the trunk A1; a list of a subscriber PC1 supported by the trunk A2; a list of subscribers PC2, PC3 whose access is influenced when the trunk A1 is failed; when a list of a subscriber PC1 whose access is influenced when the trunk A2 is failed; a list of a subscriber PC3 whose access is influenced when the trunk B is failed; and calculates and displays the real time bandwidth utilization of the trunk, the graph of the recent service or bandwidth convergence ratio, the service of the trunk or bandwidth convergence ratio, and a list of ports influenced by the failed trunk according to the instant trunk bandwidth and the limit value of the maximal trunk bandwidth configured in the network management center.

Through the above, it is convenient for a user to realize the access network, so as to provide an accurate determining ground for a user to expand the capacity, to select the best manner of expanding the capacity, and to avoid any blind expanding.

An embodiment of the present invention also provides an apparatus for obtaining the convergence ratio, the apparatus includes:

a first determining module, adapted for determining whether the present access network is a narrowband access network, and notifying the first calculating module if the present access network is a narrowband access network, or the second determining module if the present access network is not a narrowband access network;

a second determining module, adapted for receiving the notification from the first determining module, determining whether the trunk includes a sub-trunk, and sending a notification to the second calculating module if the trunk includes a sub-trunk, or the third calculating module if the trunk includes no sub-trunk;

a first calculating module, adapted for receiving the notification from the first determining module, and calculating the service convergence ratio of the trunk according to the number of available slots provided by the trunk for instant services and the number of instant service subscribers supported by the trunk. The method of this calculation is described as above, and is not repeated again;

a second calculating module, adapted for receiving the notification from the second determining module, and calculating a first bandwidth convergence ratio of the trunk according to the sub-trunk service bandwidth, the service bandwidth, and the trunk bandwidth of the trunk. The method of this calculation is described as above, and is not repeated again;

a third calculating module, adapted for receiving the notification from the second determining module, and calculating a second bandwidth convergence ratio of the trunk according to the service bandwidth and the trunk bandwidth of the trunk. The method of this calculation is described as above, and is not repeated again.

The above description is just the preferred embodiments of the present invention, and should not be construed as limitation on the protection scope of the present invention. Any modifications, equivalent replacements or improvements made within the spirit and principle of the present invention should be included in the protection scope of the present invention.

The invention claimed is:

1. A method for obtaining a convergence ratio, wherein uplink ports of an access/convergence device in an access network are classified into different trunks according to their types, the method comprising:

determining, by an apparatus, whether the access network is a narrowband access network;

if the access network is a narrowband access network, obtaining, by the apparatus, the service convergence ratio of a trunk according to the number of available slots provided by the trunk for instant services and the number of instant service subscribers supported by the trunk;

if the access network is not a narrowband access network, determining, by the apparatus, whether the trunk includes a sub-trunk;

if the trunk does not include a sub-trunk, obtaining, by the apparatus, the service convergence ratio of the trunk according to the trunk bandwidth of the trunk and the service bandwidth; and if the trunk includes a sub-trunk, obtaining, by the apparatus, the service convergence ratio of the trunk according to the trunk bandwidth of the trunk, the service bandwidth of supported subscribers and the sub-trunk service bandwidth.

2. The method according to claim 1, wherein classifying those, which access the network through uplink ports of the access/convergence device, of uplink ports of a lower-level access/convergence device under the access/convergence device into a sub-trunk of the trunk of the access/convergence device.

3. The method according to claim 1, wherein obtaining the service convergence ratio of the trunk comprises calculating a ratio between the number of available instant service slots provided by the trunk and the number of instant service subscribers supported by the trunk.

4. The method according to claim 1, wherein when the sub-trunk is not included, obtaining the bandwidth convergence ratio of the trunk according to the trunk bandwidth of the trunk and the service bandwidth comprises calculating a ratio between the trunk bandwidth and the service bandwidth of the trunk.

5. The method according to claim 1, wherein when the sub-trunk is included, obtaining the bandwidth convergence ratio of the trunk according to the trunk bandwidth of the trunk, the service bandwidth and the sub-trunk service bandwidth comprises calculating a sum of the total bandwidth of subscribers supported by the trunk and the service bandwidth of the sub-trunk, and calculating a ratio between the trunk bandwidth of the trunk and the calculated sum.

6. The method according to claim 5, wherein the service bandwidth of the sub-trunk is the smaller value of the total bandwidth of subscribers supported by the sub-trunk and the trunk bandwidth of the sub-trunk.

7. The method according to claim 1, wherein the service convergence ratio or bandwidth convergence ratio of the trunk comprises the uplink service convergence ratio or bandwidth convergence ratio of the trunk and the downlink service convergence ratio or bandwidth convergence ratio of the trunk;

corresponding to the uplink service convergence ratio or bandwidth convergence ratio, the service bandwidth of a trunk/the service bandwidth of a sub-trunk is the uplink service bandwidth of the trunk/the uplink service bandwidth of the sub-trunk;

corresponding to the downlink service convergence ratio or bandwidth convergence ratio, the service bandwidth of a trunk/the service bandwidth of a sub-trunk is the downlink service bandwidth of the trunk/the downlink service bandwidth of the sub-trunk.

8. The method according to claim 2, wherein the service convergence ratio or bandwidth convergence ratio of the trunk comprises the uplink service convergence ratio or bandwidth convergence ratio of the trunk and the downlink service convergence ratio or bandwidth convergence ratio of the trunk;
- corresponding to the uplink service convergence ratio or bandwidth convergence ratio, the service bandwidth of a trunk/the service bandwidth of a sub-trunk is the uplink service bandwidth of the trunk/the uplink service bandwidth of the sub-trunk;
- corresponding to the downlink service convergence ratio or bandwidth convergence ratio, the service bandwidth of a trunk/the service bandwidth of a sub-trunk is the downlink service bandwidth of the trunk/the downlink service bandwidth of the sub-trunk.

9. The method according to claim 3, wherein the service convergence ratio or bandwidth convergence ratio of the trunk comprises the uplink service convergence ratio or bandwidth convergence ratio of the trunk and the downlink service convergence ratio or bandwidth convergence ratio of the trunk;
- corresponding to the uplink service convergence ratio or bandwidth convergence ratio, the service bandwidth of a trunk/the service bandwidth of a sub-trunk is the uplink service bandwidth of the trunk/the uplink service bandwidth of the sub-trunk;
- corresponding to the downlink service convergence ratio or bandwidth convergence ratio, the service bandwidth of a trunk/the service bandwidth of a sub-trunk is the downlink service bandwidth of the trunk/the downlink service bandwidth of the sub-trunk.

10. The method according to claim 4, wherein the service convergence ratio or bandwidth convergence ratio of the trunk comprises the uplink service convergence ratio or bandwidth convergence ratio of the trunk and the downlink service convergence ratio or bandwidth convergence ratio of the trunk;
- corresponding to the uplink service convergence ratio or bandwidth convergence ratio, the service bandwidth of a trunk/the service bandwidth of a sub-trunk is the uplink service bandwidth of the trunk/the uplink service bandwidth of the sub-trunk;
- corresponding to the downlink service convergence ratio or bandwidth convergence ratio, the service bandwidth of a trunk/the service bandwidth of a sub-trunk is the downlink service bandwidth of the trunk/the downlink service bandwidth of the sub-trunk.

11. The method according to claim 5, wherein the service convergence ratio or bandwidth convergence ratio of the trunk comprises the uplink service convergence ratio or bandwidth convergence ratio of the trunk and the downlink service convergence ratio or bandwidth convergence ratio of the trunk;
- corresponding to the uplink service convergence ratio or bandwidth convergence ratio, the service bandwidth of a trunk/the service bandwidth of a sub-trunk is the uplink service bandwidth of the trunk/the uplink service bandwidth of the sub-trunk;
- corresponding to the downlink service convergence ratio or bandwidth convergence ratio, the service bandwidth of a trunk/the service bandwidth of a sub-trunk is the downlink service bandwidth of the trunk/the downlink service bandwidth of the sub-trunk.

12. The method according to claim 6, wherein the service or bandwidth convergence ratio of the trunk comprises the uplink service or bandwidth convergence ratio of the trunk and the downlink service or bandwidth convergence ratio of the trunk;
- corresponding to the uplink service or bandwidth convergence ratio, the service bandwidth of a trunk/the service bandwidth of a sub-trunk is the uplink service bandwidth of the trunk/the uplink service bandwidth of the sub-trunk;
- corresponding to the downlink service or bandwidth convergence ratio, the service bandwidth of a trunk/the service bandwidth of a sub-trunk is the downlink service bandwidth of the trunk/the downlink service bandwidth of the sub-trunk.

13. The method according to claim 6, wherein the sub-trunk further includes a lower-level sub-trunk, and the service bandwidth of the sub-trunk is obtained via a recursive method.

14. The method according to claim 1, further comprising: displaying, according to information on the configured network, a list of subscribers supported by the trunk, a list of subscribers whose accessing is influenced when the trunk is failed, a real time bandwidth utilization of the trunk, and a graph showing the service or bandwidth convergence ratio.

15. An apparatus for obtaining a convergence ratio, comprising:
- a first determining module, adapted for determining whether the present access network is a narrowband access network, and notifying the first calculating module or the second determining module of the determination;
- a second determining module, adapted for receiving the notification from the first determining module, determining whether the trunk includes a sub-trunk, and sending a notification of the determination to the second calculating module and the third calculating module;
- a first calculating module, adapted for receiving the notification from the first determining module, and calculating a service convergence ratio of the trunk;
- a second calculating module, adapted for receiving the notification from the second determining module, and calculating a first bandwidth convergence ratio of the trunk; and
- a third calculating module, adapted for receiving the notification from the second determining module, and calculating a second bandwidth convergence ratio of the trunk.

* * * * *